(12) United States Patent
Miller et al.

(10) Patent No.: US 10,684,625 B2
(45) Date of Patent: Jun. 16, 2020

(54) AUTOMATED PARKING FOR VIRTUAL PARKING SPOT

(71) Applicant: Robert Bosch GmbH, Stuttgart (DE)

(72) Inventors: James Stephen Miller, Dexter, MI (US); Greg Sypitkowski, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 157 days.

(21) Appl. No.: 15/691,355

(22) Filed: Aug. 30, 2017

(65) Prior Publication Data

US 2019/0064837 A1 Feb. 28, 2019

(51) Int. Cl.
*G05D 1/02* (2020.01)
*G08G 1/14* (2006.01)
*G08G 1/16* (2006.01)
*B60R 1/00* (2006.01)
*B60W 30/06* (2006.01)
(Continued)

(52) U.S. Cl.
CPC ............. *G05D 1/0246* (2013.01); *B60R 1/00* (2013.01); *B60R 1/003* (2013.01); *B60T 7/22* (2013.01); *B60T 8/17* (2013.01); *B60W 30/06* (2013.01); *B62D 13/06* (2013.01); *B62D 15/0285* (2013.01); *G05D 1/0212* (2013.01); *G05D 1/0214* (2013.01); *G05D 1/0223* (2013.01); *G08G 1/143* (2013.01); *G08G 1/168* (2013.01); *B60R 2300/806* (2013.01); *B60T 2201/10* (2013.01); *B60W 2420/403* (2013.01); *B60W 2420/52* (2013.01); *B60W 2420/54* (2013.01);
(Continued)

(58) Field of Classification Search
None
See application file for complete search history.

(56) References Cited

U.S. PATENT DOCUMENTS 7,225,070 B2 5/2007 Li
9,361,803 B2 6/2016 Lee
(Continued)

FOREIGN PATENT DOCUMENTS

DE 102016211180 A1 3/2017
EP 1862376 A2 12/2007
(Continued)

*Primary Examiner* — Jonathan M Dager
*Assistant Examiner* — Garrett F Evans
(74) *Attorney, Agent, or Firm* — Michael Best & Friedrich LLP (57) ABSTRACT

A system for parking a vehicle in a location that is not defined by parking lines or by surrounding vehicles. In one example, the system comprises a user interface, an electromagnetic radiation sensor, and an electronic controller. The electronic controller receives information about the vehicle's surroundings via the electromagnetic radiation sensor. The electronic controller also receives a desired parking location via the user interface. Using the information about the vehicle's surroundings and the desired parking location the electronic controller creates a virtual parking boundary and determines reference points. As the electronic controller moves the vehicle into a parking location the electronic controller tracks the reference points, determines the distance between the vehicle and the parking location, and detects obstructions in the parking location or in the vehicle's path to the parking location.

20 Claims, 8 Drawing Sheets

(51) Int. Cl.
    *B62D 13/06*         (2006.01)
    *B62D 15/02*         (2006.01)
    *B60T 7/22*           (2006.01)
    *B60T 8/17*           (2006.01)

(52) U.S. Cl.
    CPC ....... *B60W 2554/00* (2020.02); *G05D 1/0257* (2013.01); *G05D 2201/0213* (2013.01)

(56) References Cited

U.S. PATENT DOCUMENTS

| | | |
|---|---|---|
| 9,472,100 B2 | 10/2016 | Barnes et al. |
| 10,046,803 B2 * | 8/2018 | Singh ........................ B60R 1/00 |
| 2013/0085637 A1 | 4/2013 | Grimm et al. |
| 2014/0309888 A1 | 10/2014 | Smit et al. |
| 2016/0001705 A1 | 1/2016 | Greenwood et al. |
| 2017/0043808 A1 | 2/2017 | Yang |
| 2017/0060133 A1 | 3/2017 | Seo et al. |
| 2017/0217372 A1 * | 8/2017 | Lu ............................ B60R 1/00 |
| 2017/0270370 A1 * | 9/2017 | Utagawa ................... B60R 1/00 |
| 2017/0355307 A1 * | 12/2017 | Ha ........................ G08G 1/143 |

FOREIGN PATENT DOCUMENTS

| | | |
|---|---|---|
| GB | 239848 B | 3/2006 |
| GB | 2398049 B | 4/2006 |

* cited by examiner

AUTOMATED PARKING FOR VIRTUAL PARKING SPOT

FIELD

Embodiments relate to automated parking for vehicles.

BACKGROUND

Modern vehicles include various partially autonomous driving functions, for example adaptive cruise-control, collision avoidance systems, self-parking, and the like. Fully autonomous driving is a goal, but has not yet been achieved, at least on market-ready, commercially viable scale.

SUMMARY

One aspect of automated control for vehicles is automated parking. Some modern vehicles are able to park autonomously in locations defined by parking lines or by other vehicles. However, a vehicle needs to be able to be parked in areas that are undefined by parking lines or other vehicles. Examples of areas without parking lines or other vehicles defining a parking location may include a campground, a boat launch, and a lawn. Because there are multiple locations where a vehicle may be parked in these types of areas, a method for parking a vehicle autonomously requires a user to indicate the location where they want the vehicle to park. Embodiments described herein provide, among other things, a system and method for autonomously parking a vehicle in a location undefined by parking lines or other vehicles. Through environment detection the system can also determine a specific location to park a vehicle upon receiving, as input, a general location. The embodiments described herein can be applied to parking a vehicle, a trailer, or a vehicle with a trailer attached.

Embodiments provide, among other things, a system and a method for parking a vehicle in a location that is not defined by parking lines or by surrounding vehicles. One embodiment provides a system for parking a vehicle in a location that is not defined by parking lines or by surrounding vehicles. The system comprises a user interface, an electromagnetic radiation sensor, and an electronic controller. The electronic controller receives information about the vehicle's surroundings via the electromagnetic radiation sensor. The electronic controller also receives a desired parking location via the user interface. Using the information about the vehicle's surroundings and the desired parking location the electronic controller creates a virtual parking boundary and determines reference points. As the electronic controller moves the vehicle into a parking location the electronic controller tracks the reference points, determines the distance between the vehicle and the parking location, and detects obstructions in the parking location or in the vehicle's path to the parking location.

Another embodiment provides a method for parking a vehicle in a location that is not defined by parking lines or by surrounding vehicles. The method comprises receiving information about the vehicle's surroundings via an electromagnetic radiation sensor and receiving a desired parking location via a user interface. The method further comprises creating a virtual parking boundary with an electronic controller and determining reference points within the vehicle's surroundings. The method also comprises controlling the vehicle to move the vehicle into a parking location. The method comprises determining the distance between the parking location and the vehicle, tracking the reference points, and detecting obstructions in the parking location or in the vehicle's path to the parking location as the vehicle moves to the parking location.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
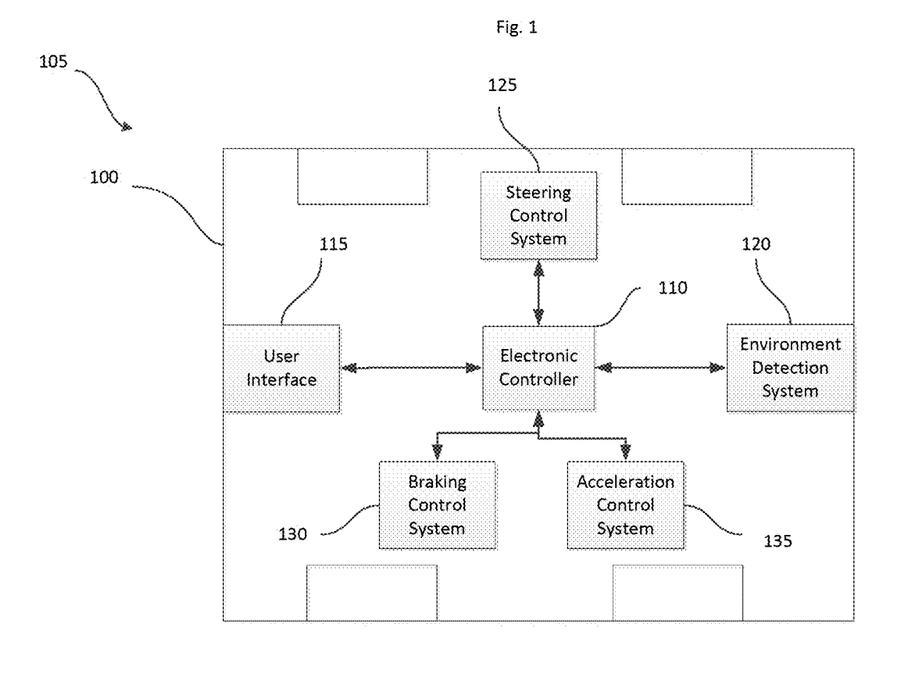
FIG. 1 is a block diagram of a vehicle equipped with a system for autonomously parking a vehicle in a location that is not defined by parking lines or other vehicles.

FIG. 1 illustrates a vehicle 100 equipped with a system 105 for autonomously parking a vehicle in a location that is not defined by parking lines or other vehicles. The vehicle 100, although illustrated as a four-wheeled vehicle, may encompass various types and designs of vehicles. For example, the vehicle 100 may be an automobile, a motorcycle, a truck, a bus, a semi-tractor, and others. The vehicle 100 includes at least some autonomous functionality, but may also require a driver or operator to perform driving functions. In the example illustrated, the system 105 includes several hardware components including an electronic controller 110, a user interface 115, an environment detection system 120, a steering control system 125, a braking control system 130, and an acceleration control system 135. The components of the system 105 may be of various constructions and may use various communication types and protocols.

The electronic controller 110 may be communicatively connected to the user interface 115, environment detection system 120, steering control system 125, braking control system 130, and acceleration control system 135 via various wired or wireless connections. For example, in some embodiments, the electronic controller 110 is directly coupled via a dedicated wire to each of the above-listed components of the system 105 for autonomously parking a vehicle in a location that is not defined by parking lines or other vehicles. In other embodiments, the electronic controller 110 is communicatively coupled to one or more of the components via a shared communication link such as a vehicle communication bus (for example, a controller area network (CAN) bus) or a wireless connection.

Each of the components of the system 105 may communicate with the electronic controller 110 using various communication protocols. The embodiment illustrated in FIG. 1 provides but one example of the components and connections of the system 105. However, these components and connections may be constructed in other ways than those illustrated and described herein.

Figure 2:
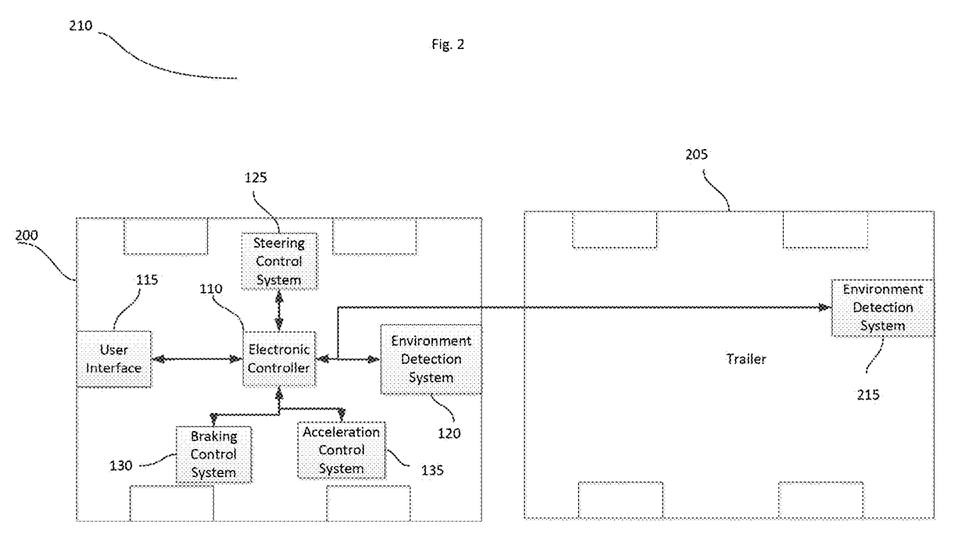
FIG. 2 is a block diagram of a vehicle and a trailer equipped with a system for autonomously parking the vehicle and/or the trailer in a location that is not defined by parking lines or other vehicles.

FIG. 2 illustrates an example of a vehicle 200 attached to a trailer 205 and equipped with a system 210 for autonomously parking a trailer in a location that is not defined by parking lines or other vehicles. The vehicle 200 with the system 210 has components that are the same as or similar to the components of the vehicle 100. The system 210 of the vehicle 200 is different from the system 105 because the electronic controller 110 of vehicle 200 is also connected to the environment detection system 215 of the trailer 205. The electronic controller 110 receives information about the vehicle's surroundings and trailer's surroundings from the vehicle's environment detection system 120 as well as the trailer's environment detection system 215.

The electronic controller 110 may be communicatively connected to the trailer's environment detection system 215 via various wired or wireless connections. For example, in some embodiments, the electronic controller 110 is directly coupled via a dedicated wire to the trailer's environment detection system 215. In other embodiments, the electronic controller 110 is communicatively coupled to the trailer's environment detection system 215 via a shared communication link such as a vehicle communication bus (for example, a controller area network (CAN) bus) or a wireless connection.

Figure 3:
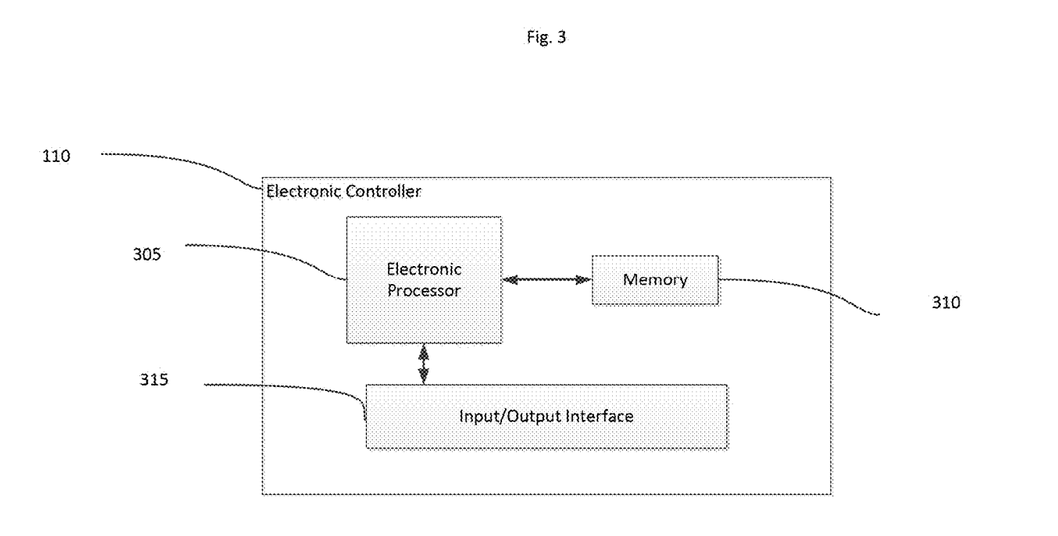
FIG. 3 is a block diagram of an electronic controller of the system of FIG. 1 and the system of FIG. 2.

FIG. 3 is a block diagram of the electronic controller 110 of the systems of FIG. 1 and FIG. 2. The electronic controller 110 includes a plurality of electrical and electronic components that provide power, operation control, and protection to the components and modules within the electronic controller 110. The electronic controller 110 includes, among other things, an electronic processor 305 (such as a programmable electronic microprocessor, microcontroller, or similar device), a memory 310 (for example, non-transitory, machine readable memory), and an input/output interface 315. The electronic processor 305 is communicatively connected to the memory 310 and the input/output interface 315. The electronic processor 305, in coordination with the memory 310 and the input/output interface 315, is configured to implement, among other things, the methods described herein.

The electronic controller 110 may be implemented in several independent controllers (for example, programmable electronic controllers) each configured to perform specific functions or sub-functions. Additionally, the electronic controller 110 may contain sub-modules that include additional electronic processors, memory, or application specific integrated circuits (ASICs) for handling input/output functions, processing of signals, and application of the methods listed below. In other embodiments, the electronic controller 110 includes additional, fewer, or different components.

Figure 4:
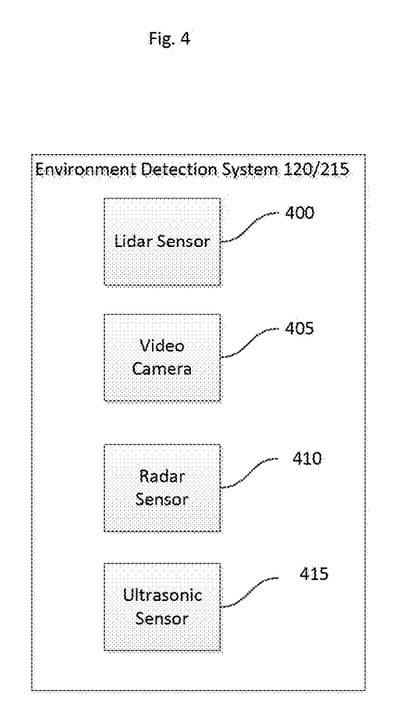
FIG. 4 is a block diagram of an environment detection system of the system of FIG. 1 and the system of FIG. 2.

FIG. 4 is a block diagram of the environment detection system 120 of the vehicle 100 and the environment detection system 215 of the trailer 205. The environment detection systems 120 and 215 comprise an electromagnetic radiation sensor. A lidar sensor 400, a video camera 405, and a radar sensor 410 are examples of electromagnetic radiation sensors. The environment detection systems 120 and 215 may also comprise an ultrasonic sensor 415 in addition to the electromagnetic radiation sensor. In one embodiment the vehicle's environment may be detected using only the video camera 405. In other embodiments, the environment detection systems 120 and 215 may use additional sensors, such as a lidar sensor 400, radar sensor 410 or ultrasonic sensor 415, in combination with the video camera 405. There may be more than one of each of the sensors and they may be located at different positions on the interior or exterior of the vehicle 100 or the trailer 205. For example, the video camera 405, or components thereof, may be externally mounted to a portion of the vehicle 100 (such as on a side mirror or a trunk door). Alternatively the video camera 405, or components thereof, may be internally mounted within the vehicle 100 (for example, positioned by the rearview mirror). The sensors of the environment detection systems 120 and 215 are configured to receive signals indicative of the vehicle's distance or the trailer's distance from and position relative to, elements in the vehicle's surrounding environment or the trailer's surrounding environment as the vehicle 100 moves from one point to another.

Figure 5:
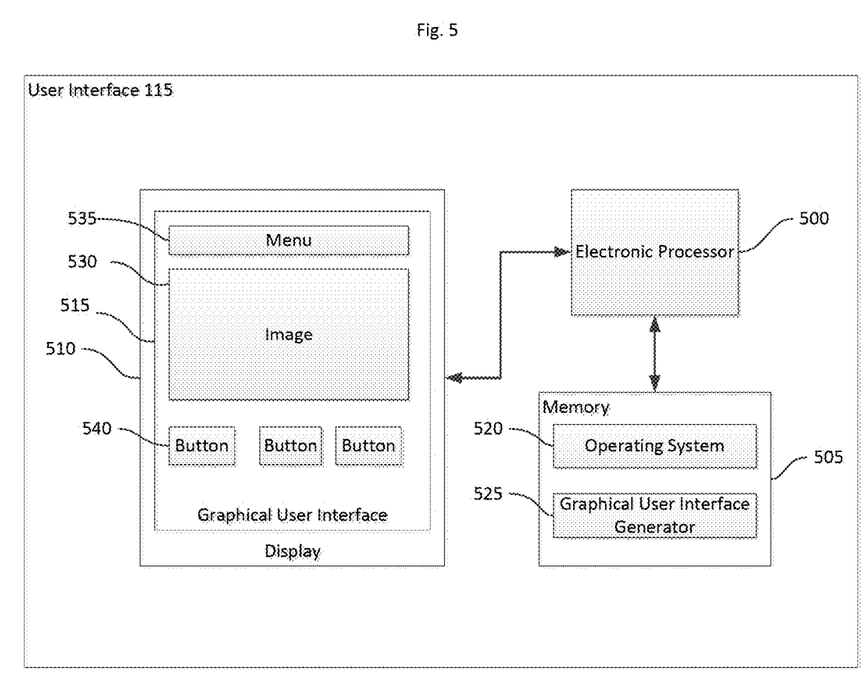
FIG. 5 is a block diagram of a user interface of the system of FIG. 1 and the system of FIG. 2.

FIG. 5 is a block diagram of the user interface 115 of the systems of FIG. 1 and FIG. 2. The user interface 115 includes, among other things, an electronic processor 500 (such as a programmable electronic microprocessor, microcontroller, or similar device), a memory 505 (for example, non-transitory, machine readable memory), and a display 510. The electronic processor 500 is communicatively connected to the memory 505 and the display 510. The memory 505 has stored within it several software components for creating a graphical user interface 515 and processing user input, including an operating system 520 and a graphical user interface generator 525. The electronic processor 500, in coordination with the memory 505 and the display 510, is configured to generate the graphical user interface 515 and receive user input from the display 510. The display 510 is a touch screen displaying the graphical user interface 515. One or more images 530 captured by the environment detection system 120 may be displayed within the graphical user interface 515. The graphical user interface 515 may also display elements such as a menu 535 and virtual buttons 540. The user is able to input information into the display 510 in a variety of ways, such as selecting via a mouse or touching the image 530, the menu 535, or the virtual buttons 540.

Figure 6:
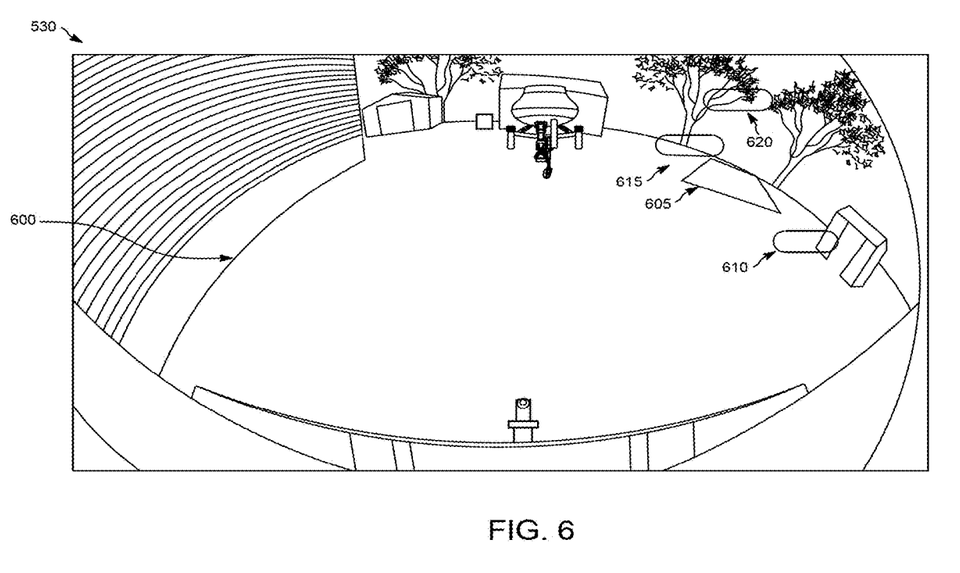
FIG. 6 is an illustration of a virtual parking boundary projected in an image displayed by a user interface.

FIG. 6 illustrates the image 530 displayed within the graphical user interface 515. The image 530 is a live stream of footage 600 from the environment detection system's 120 video camera 405. If the trailer 205 is attached to the vehicle, the image 530 is a live stream of footage 600 from the environment detection system's 215 video camera 405. Input from the display 510, such as the image 530 being touched, informs the system 105 of the location the vehicle should be parked in. Upon receiving this input a virtual parking boundary 605 is created by the electronic control unit 110 and appears on the live stream of footage 600 from the environment detection system's 120 video camera 405. The virtual parking boundary 605 is a projection on the ground plane of the live stream of footage 600 from the environment detection system's 120 video camera 405. The location of the virtual parking boundary 605 may be changed via input received by the display 510, such as touching and dragging the virtual parking boundary 605 to a new location on the image 530.

The virtual parking boundary 605 defines a parking location for the vehicle 100 and a parking orientation for the vehicle 100. The size of the virtual parking boundary 605 represents the area the vehicle 100 would cover were it parked in the location the system received as input from the user interface 115. The graphical user interface generator 525 may be configured to manipulate the virtual parking boundary 605 based on the user's input and an amount of distortion of the image 530. For example, if the image 530 has a fisheye distortion the graphical user interface generator 525 changes the shape of the virtual parking boundary 605 to account for the image's fisheye distortion.

The electronic controller 110 chooses reference points in and around the virtual parking boundary 605 to track as the vehicle 100 moves. A reference point must have distinctive enough features for the electronic controller 110 to be able to track it. Examples of reference points that can be tracked are a corner of a building, painted lines, a tree branch, or a shrub. Reference points 610, 615, and 620 all have distinctive enough features that the electronic controller 110 is able to track them. Reference point 610 is a corner of the base of a shed, reference point 615 is the base of a tree, and reference point 620 is a tree branch. As the vehicle 100 moves the electronic controller 110 calculates or determines the validity of the reference points 610, 615, and 620. Valid reference points are located on a plane the vehicle 100 can park in. The vehicle 100 can park in the ground plane or in a plane that is angled with respect to a ground plane, such as a boat launch. For example, reference points 610 and 615 are valid reference points because they are in the ground plane. Reference point 620 is not a valid reference point because it is not in a plane that the vehicle 100 can park in.

Figure 7:
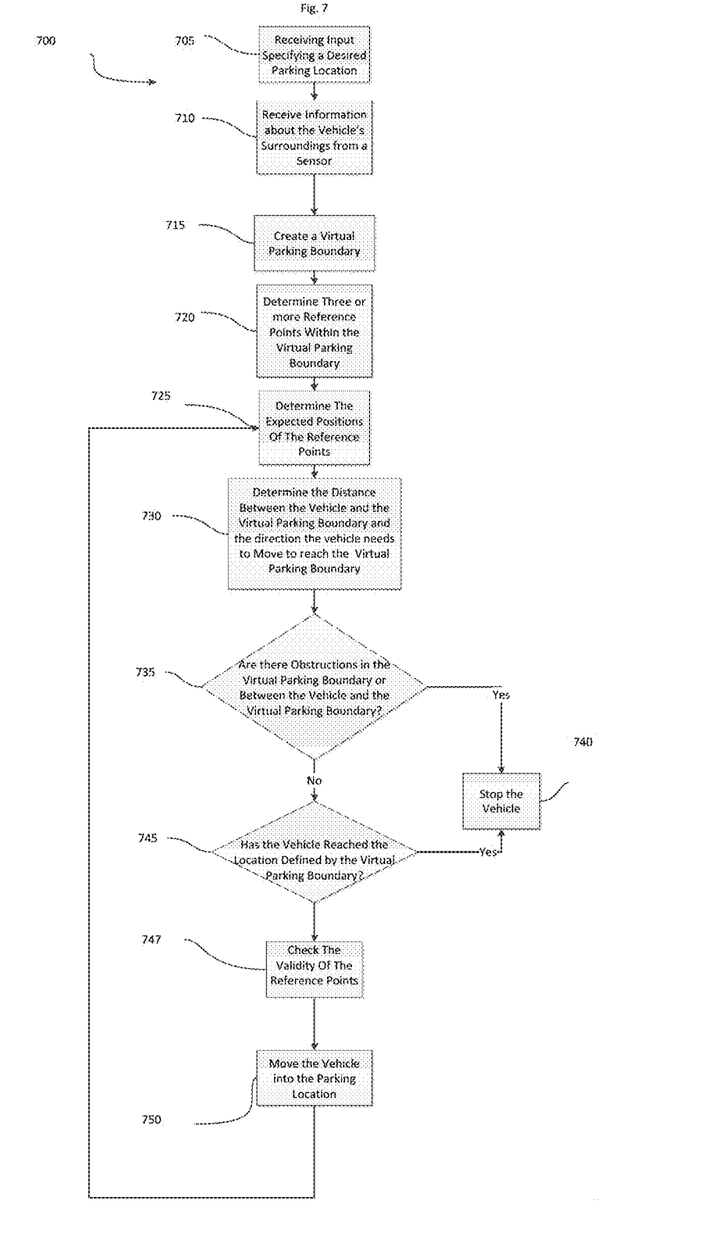
FIG. 7 is a flowchart of a method for using the system of FIG. 1 or FIG. 2 to autonomously park a vehicle and/or a trailer in a location that is not defined by parking lines or other vehicles.

FIG. 7 illustrates a method 700 of autonomously parking a vehicle 100 in a location that is not defined by parking lines or other vehicles using the system 105. The electronic controller 110 receives, as input from the user interface 115, a desired parking location for the vehicle (block 705). The desired parking location can be a general area rather than a specific parking location. The electronic controller 110 also receives, as input from the environment detection system 120, information about the vehicle's environment (block 710). The electronic controller 110 creates the virtual parking boundary 605 by determining the position of objects in the vehicle's environment relative to the desired parking location (block 715). If there is an object in the desired parking location or less than a predetermined distance from the desired parking location the electronic controller 110 offsets the virtual parking boundary 605 from the desired parking location so that the virtual parking boundary 605 is at least the predetermined distance from all detected objects.

The electronic controller 110 chooses at least three reference points in the virtual parking boundary 605 with distinctive enough features that the electronic controller 110 can track the reference points as the vehicle 100 moves (block 720). The electronic controller 110 determines the location it expects the reference points to be in as the vehicle 100 moves (block 725). The electronic controller 110 calculates or determines the distance between the vehicle 100 and the location defined by the virtual parking boundary 605 (block 730). The electronic controller 110 checks, via input from the environment detection system 120, that there are no obstructions in the vehicle's path to the location defined by the virtual parking boundary 605 (block 735). By sending signals to the steering control system 125, the braking control system 130, and the acceleration control system 135 the electronic controller 110 controls the movement of the vehicle 100. By controlling the movement of the vehicle 100 the electronic controller 110 moves the vehicle 100 into the parking location defined by the virtual parking boundary 605 (block 750). As the vehicle 100 moves, the electronic controller 110 continues to check that there are no obstructions in the vehicle's path to the location defined by the virtual parking boundary 605 (block 735). If the electronic controller 110 detects an obstruction in the vehicle's path to the location defined by the virtual parking boundary 605 it sends a signal to the braking control system 130 to stop the vehicle 100 (block 740). The electronic controller 110 also determines, by executing the method described below, if new reference points should be chosen (block 747). When the vehicle 100 reaches the location defined by the virtual parking boundary 605 (block 730), the electronic controller 110 sends a signal to the braking control system 130 to stop the vehicle 100 (block 740).

The method 700 described above also applies to the system 210 for autonomously parking a trailer 205 in a location that is not defined by parking lines or other vehicles.

Figure 8:
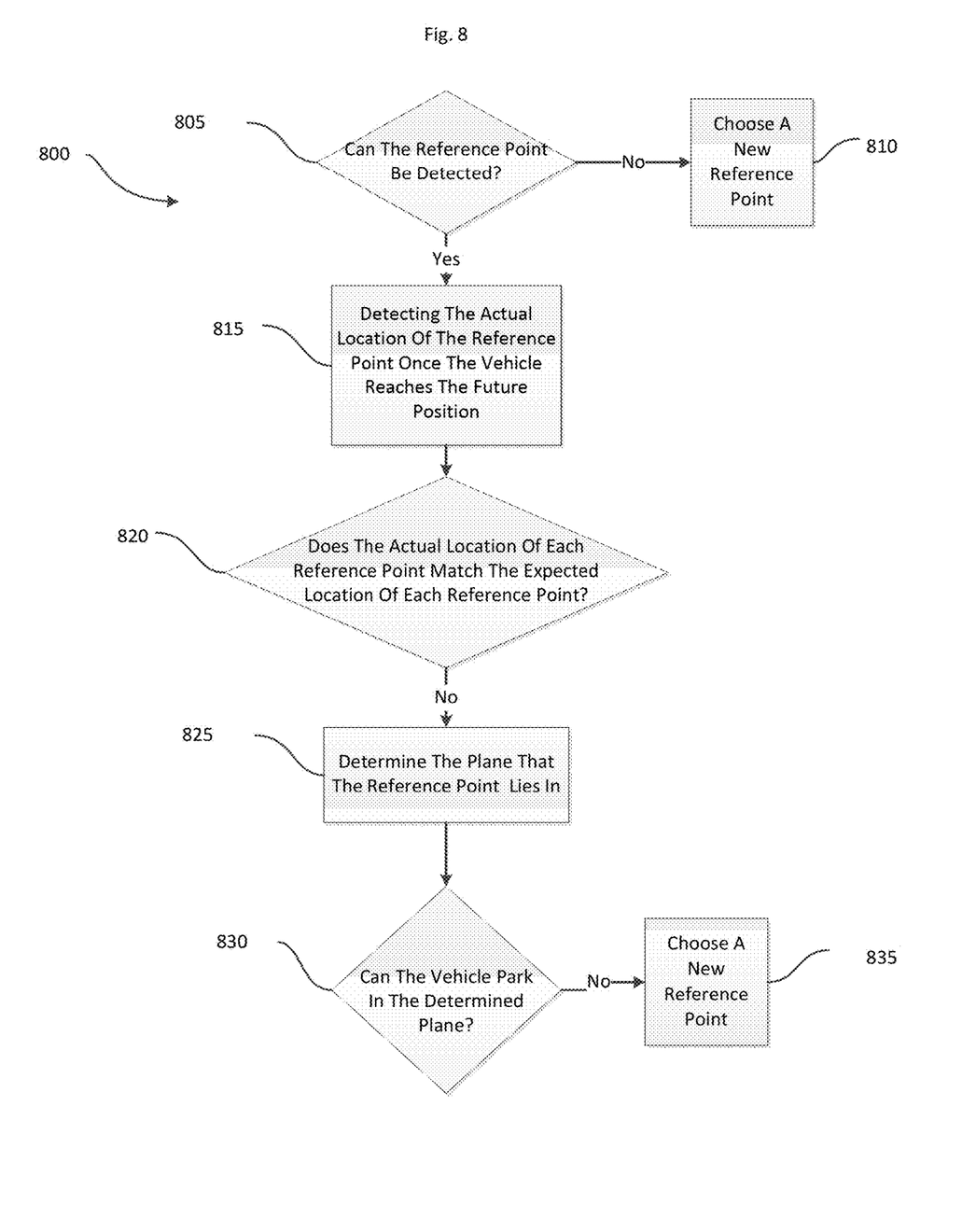
FIG. 8 is a flow chart of a method for determining if the electronic controller should select a new reference point.

FIG. 8 illustrates a method 800 of checking the validity of reference points (block 747). The electronic controller 110 determines an expected location for each reference point at a future position of the vehicle 100 (block 725). As the vehicle 100 moves, the environment detection system 120 may not be able to detect some reference points (block 805). If the environment detection system 120 cannot detect a reference point, the electronic controller 110 may choose a new reference point (block 810). If the environment detection system 120 can detect a reference point, the electronic controller 110 determines an actual location of the reference point (block 815) and compares the actual location of the reference point to the expected location of the reference point (block 820). If the actual location of the reference point does not match the expected location of the reference point the electronic controller 110 determines a plane the reference point is in (block 825) and checks if the vehicle 100 can park in the determined plane (block 830). If the vehicle 100 cannot park in the determined plane, the electronic controller 110 may choose a new reference point to track (block 835).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Various features, advantages, and embodiments are set forth in the following claims.

The invention claimed is:

1. A system for parking a vehicle in a location that is not defined by parking lines or by surrounding vehicles, the system comprising;
   a user interface;
   an electromagnetic radiation sensor; and
   an electronic controller configured to
   receive, via the electromagnetic radiation sensor, information about the vehicle's surroundings,
   receive, via the user interface, a desired parking location undefined by parking lines or surrounding vehicles,
   create a virtual parking boundary defining a parking location based on the desired parking location,
   determine reference points within the vehicle's surroundings,
   track the reference points by,
      determining an expected location for each reference point at a future position of the vehicle;
      moving the vehicle to the future position and, in the future position, detecting an actual location of each of the reference points;
      determining a plane of each reference point with an actual location that does not match the expected location determined for the reference point; and
      determining a new reference point if the vehicle is not able to park in the plane or if the actual location of the reference point cannot be detected;
   control the vehicle to move the vehicle into the parking location.

2. The system according to claim 1, wherein the user interface is a touch screen that displays a live stream of footage from a video camera.

3. The system according to claim 1, wherein the virtual parking boundary is a projection on a ground plane that defines an area having a size of the vehicle and a parking orientation for the vehicle.

4. The system according to claim 2, wherein the virtual parking boundary is displayed by the user interface.

5. The system according to claim 1, wherein the electronic controller is configured to send a signal to a braking control system to stop the vehicle when an obstruction is detected in the parking location or in the vehicle's path to the parking location.

6. The system according to claim 1, wherein the electromagnetic radiation sensor is a video camera.

7. The system according to claim 1, wherein the electronic controller is configured to offset the virtual parking boundary from the desired parking location when a distance between an object and the desired parking location is detected to be less than a predetermined distance.

8. The system according to claim 6, further comprising a lidar sensor, radar sensor, or an ultrasonic sensor, configured to provide information about the vehicle's surroundings.

9. The system according to claim 1, wherein the electronic controller is configured to, upon receiving a general area as the desired parking location, determine a specific parking location within the general area.

10. The system according to claim 1, wherein the reference points are within or around the virtual parking boundary.

11. A method for parking a vehicle in a location that is not defined by parking lines or by surrounding vehicles, the method comprising;
    receiving, via an electromagnetic radiation sensor, information about the vehicle's surroundings;
    receiving, via a user interface, a desired parking location undefined by parking lines or surrounding vehicles;
    creating, with an electronic controller, a virtual parking boundary defining a parking location based on the desired parking location;
    determining, with the electronic controller, reference points within the vehicle's surroundings;
    tracking, with the electronic controller, the reference points by
       determining an expected location for each reference point at a future position of the vehicle;
       moving the vehicle to the future position and, in the future position, detecting an actual location of each of the reference points;
       determining a plane of each reference point with an actual location that does not match the expected location determined for the reference point; and
       determining a new reference point if the vehicle is not able to park in the plane or if the actual location of the reference point cannot be detected; and
    controlling, with the electronic controller, the vehicle to move the vehicle into the parking location.

12. The method according to claim 11, wherein the user interface is a touch screen that display a live stream of footage from a video camera.

13. The method according to claim 11, wherein the virtual parking boundary is a projection on a ground plane that defines an area having a size of the vehicle and a parking orientation for the vehicle.

14. The method according to claim 12, wherein the virtual parking boundary is displayed by the user interface.

15. The method according to claim 11, the method further comprising sending a signal to a braking control system to stop the vehicle when an obstruction is detected in the parking location or in the vehicle's path to the parking location.

16. The method according to claim 11, wherein the electromagnetic radiation sensor is a video camera.

17. The method according to claim 11, the method further comprising offsetting the virtual parking boundary from the desired parking location when a distance between an object and the desired parking location is detected to be less than a predetermined distance.

18. The method according to claim 16, the method further comprising receiving information about the vehicle's surroundings from a lidar sensor, radar sensor, or an ultrasonic sensor.

19. The method according to claim 11, the method further comprising upon receiving a general area as the desired parking location, determining a specific parking location within the general area.

20. The method according to claim 11, wherein the reference points are within or around the virtual parking boundary.

* * * * *